INVENTORS
ED FLETCHER &
DELBERT E. STROUD

ATTORNEYS

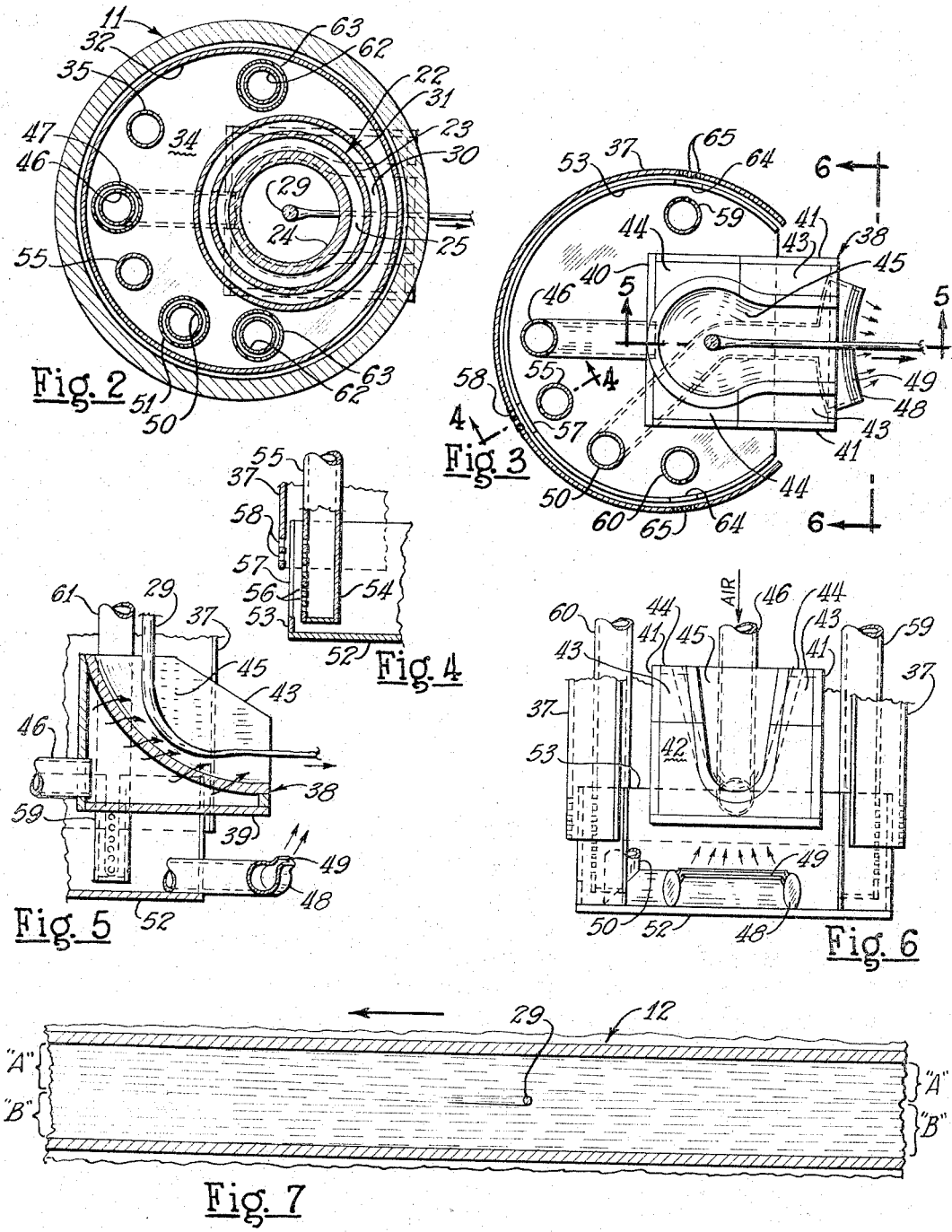

United States Patent Office 3,337,316
Patented Aug. 22, 1967

3,337,316
GLASS DISTRIBUTION MEANS FOR A ROTARY FIBER-FORMING APPARATUS
Ed Fletcher and Delbert E. Stroud, Newark, Ohio, assignors to Owens-Corning Fiberglas Corporation, a corporation of Delaware
Filed Sept. 29, 1964, Ser. No. 400,142
2 Claims. (Cl. 65—14)

This invention relates to apparatus for forming fine fibers from molten mineral material, particularly glass, of the type in which the fibers are formed by centrifuging streams of molten glass from a rotor having a circular periphery that is provided with a plurality of circumferentially extending, vertically spaced rows of stream forming orifices.

The apparatus of the invention relates more particularly to distribution means for leading a supply stream of molten glass into the interior of a hollow rotary centrifuge and for distributing the glass in the stream on the inner surface of the peripheral wall of the centrifuge in a uniform layer from which the material is then projected by centrifugal force through the stream forming orifices and from the centrifuge.

For purposes of illustration in describing the apparatus embodying the invention, there is generally shown a rotary fiber forming apparatus having a hollow circular centrifuge which projects the streams of glass radially outwardly therefrom through a heated zone provided by a circular burner and into a blast of high pressure gas, such as steam, which turns the streams downwardly and attenuates them into very fine fibers.

The problem of distributing glass uniformly over the interior surface of a rotary centrifuge has been given considerable attention in the rotary fiberizing art and various suggestions have been made. Two general types of apparatuses have been given the most attention. Mechanical means such as the "basket distributor" of the type illustrated, for example, in Levecque et al. U.S. Patent No. 2,980,954, are mounted in and are rotated with the centrifuge itself and function to disrupt a supply stream and to cause the material of the stream to be thrown or flow outwardly to the wall of the centrifuge. These apparatuses all operate on the theory that the main supply stream of glass is to be broken up into a multiplicity of smaller streams and these smaller streams distributed over the inner face of the centrifuge. This introduces a very serious difficulty into apparatuses of this kind because it results in a great heat loss from the supply of molten glass. In apparatuses of this type, the glass is usually at its hottest when it first enters the fiberizing apparatus, being fed as a relatively thick stream downwardly into the apparatus from the forehearth of a glass melting tank, for example, where it has been raised to a high temperature. When the distributor breaks up the main supply stream into a multiplicity of smaller streams for distribution over the centrifuge wall, the surface area is, of course, greatly increased and radiation heat loss from the glass is likewise increased.

Another type of glass distribution means is that disclosed, for example, Henry J. Snow, U.S. Patent No. 3,014,235, in which a supply stream of glass is flowed downwardly into the interior of the centrifuge and then distributed outwardly to the wall of the centrifuge by a blast of gas, for example air, which is so directed as to impinge against the stream and to divert it radially outwardly. Such an air jet distribution means has a very distinct advantage over the mechanical type earlier described in that the stream of glass is not disrupted into many smaller streams, but kept as a single stream, so that the heat loss by radiation is held to a minimum. The action of the jet may also cause the stream to "flutter" somewhat, thereby achieving vertical distribution over the inner surface of the circular wall of the centrifuge.

In both of these systems, however, some problems of control still remain unsolved. Because the main supply stream usually is fed downwardly through the interior of a hollow rotary quill on the lower end of which the centrifuge is mounted, heat loss from the supply stream to the quill is substantial. Because the quill and centrifuge rotate at high speed, somewhat erratic currents of ambient air and other gases flow through the quill, often causing the supply stream to sway or meander often varying the point of impingement of the supply stream on a mechanical distributor or the alignment of the supply stream with a jet type distributor. In either system, such changes result in uneven distribution which, of course, results in unequal flow through the orifices in the centrifuge wall and variations in the fibers produced.

It is the principal object of the instant invention to improve apparatus for glass distribution to the peripheral wall of a hollow centrifuge so as to control heat loss from a molten glass stream during its movement downwardly into the interior of the centrifuge and to improve the control over distribution of the supply stream to the interior wall of the centrifuge.

It is another object of the instant invention to provide improvements in the glass distribution apparatus of a hollow, stream forming centrifuge by which the supply stream is precisely controlled and laid down on the interior surface of the centrifuge periphery in a precise, repetitive pattern.

It is a further object of the instant invention to provide an air jet and chute distributor for distributing a supply stream of molten glass over the inner surface of the peripheral wall of a centrifuge which lays the stream on the surface in a controlled repetitive helical pattern timed according to the speed of rotation of the centrifuge so as to maintain thereon a relatively thin, uniform layer of molten glass as the glass feeds outwardly through the orifices in the centrifuge wall.

A yet further object of the instant invention is to provide an air cushioned diverting means and a cooperating pulsating air jet both located in the interior of the centrifuge whereby the supply stream of glass is directed outwardly to the inner wall of the centrifuge, and laid thereon in a controlled helical pattern which moves up and down the inner cylindrical wall of the centrifuge, completing each traverse in timed relation to the rotation of the centrifuge.

These and other more specific objects and advantages of apparatus embodying the instant invention will be better understood by reference to the specification which follows and to the attached drawings in which:

FIG. 2 is a horizontal, sectional view taken along the line 2—2 of FIG. 1 and shown on an enlarged scale;

FIG. 3 is a horizontal sectional view taken along the line 3—3 of FIG. 1 and aslo shown on an enlarged scale;

FIG. 4 is a fragmentary, vertical sectional view taken from the position indicated by the line 4—4 of FIG. 3;

FIG. 5 is a fragmentary, vertical sectional view taken along the line 5—5 of FIG. 3;

FIG. 6 is a fragmentary view in elevation taken from the position indicated by the line 6—6 of FIG. 3; and FIG. 7 is a fragmentary view in elevation taken from the position indicated by the line 7—7 of FIG. 1 and illustrating the pattern in which a supply stream is laid down by distribution apparatus embodying the invention.

Figure 1:
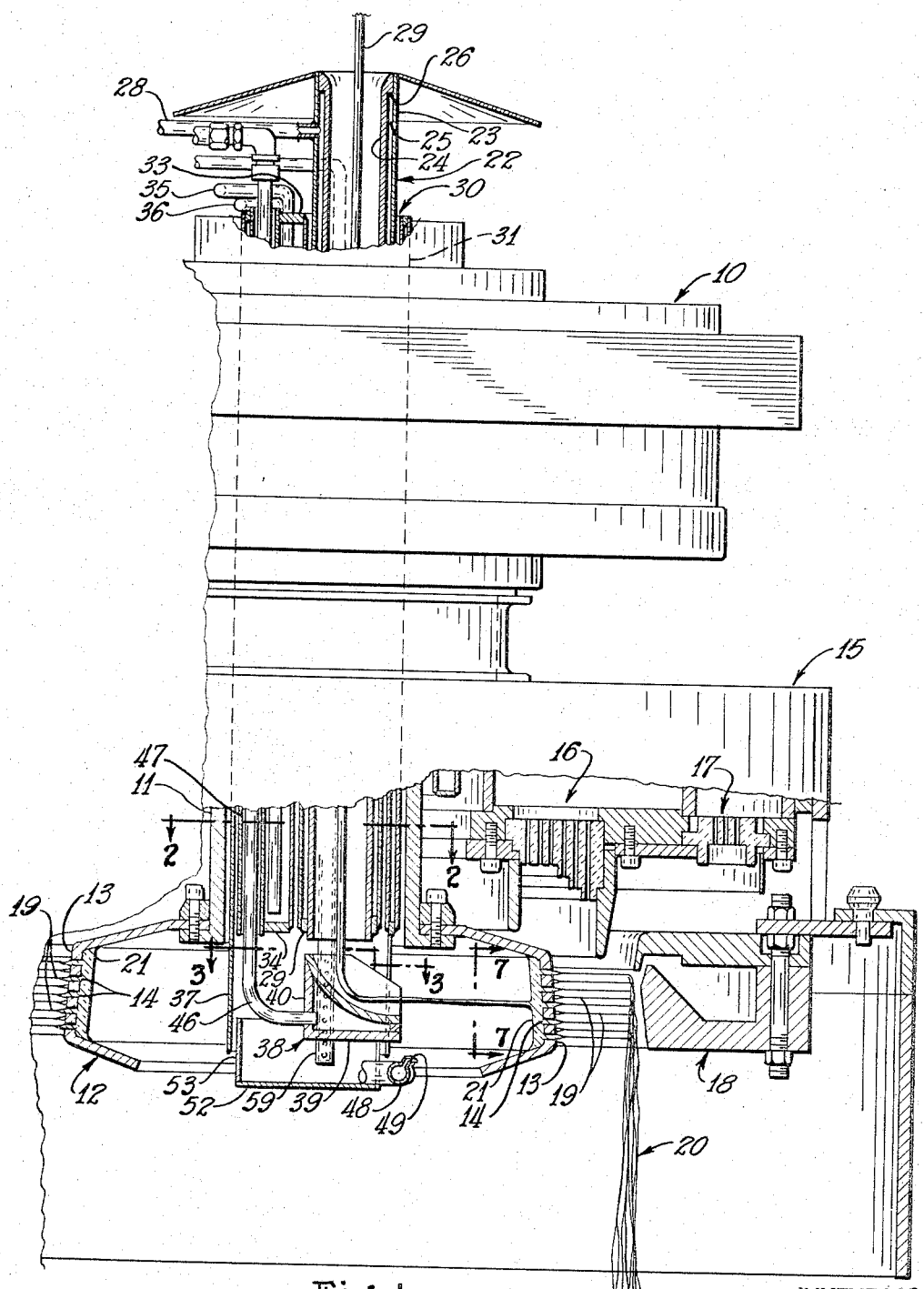
FIG. 1 is a fragmentary view, partly in elevation and partly in vertical section, showing a rotary glass fiberizing apparatus of the general type described above and illustrating a specific glass distribution apparatus embodying the invention installed in the fiberizing apparatus.

As an illustration of the type of rotary fiber forming apparatus of the general type described above and illus- the invention is designed to be employed, there is shown in FIG. 1 a motor housing 10 which encloses drive means and bearings for a hollow rotary quill 11 on the lower end of which there is removably mounted a hollow centrifuge 12 having a circular peripheral wall 13 in which is formed a plurality of circumferentially extending, vertically spaced, rows of stream forming orifices 14. A manifold housing 15 contains gas mixing chambers for an inner, annular burner generally indicated at 16 and an outer annular burner generally indicated at 17. The inner burner 16 is so assembled and directed that it plays its flames over the outer side of the periphery 13 of the centrifuge 12. An annular blower 18 is mounted concentrically with and spaced from the periphery of the centrifuge 12 so that streams of glass 19 projected from the stream forming orifices 14 by the centrifugal force created by rotation of the centrifuge 12, fly outwardly from the centrifuge 12 and into an annular blast of gases from the blower 18 which attenuates them to form extremely fine fibers in a hollow downwardly moving veil generally indicated at 20. A more complete description of the operation of an apparatus of this type is set forth in Kleist et al. Patent No. 2,949,632, which illustrates the use and functioning of the two annular burners 16 and 17 and the blower 18 in carrying out the formation of fine glass fibers from molten glass.

In accordance with the operation explained in the said Kleist et al. patent, the streams 19 of glass are projected through the stream forming orifices 14 by reason of the presence of an annular layer 21 of molten glass that is built up on the interior surface of the peripheral wall 13 of the centrifuge 12 and from which the glass is supplied to the orifices 14 for forming the streams 19. One of the difficult problems in the operation of this type of an apparatus for the formation of fine glass fibers of uniform characteristics is to build up and maintain the relatively uniform layer 21 as a "head" upon which the centrifugal force may be applied and to replenish the layer 21 of glass as it is flowed outwardly through the orifices 14.

In order to insure uniformity of fibers, and, of course, with uniformity of other conditions maintained, it is necessary that the supply of glass in the layer 21 be maintained relatively uniform and that it be replenished as it is used up so that the mass in this rotating annular body of glass does not vary greatly from one point around the periphery of the centrifuge 12 to another or from one period of time to another. It is to this problem of uniformly distributing the supply of glass into the "head" layer 21 that the instant invention is directed.

Apparatus illustrated in the drawings and embodying the instant invention includes a glass supply guide tube generally indicated at 22 which, in this embodiment, is a double-walled tube, being formed by an outer tube 23 and an inner tube 24 between which there is thus formed an annular chamber 25 which extends almost throughout the length of the guide tube 22. The chamber 25 is closed by a flared lip 26 at the upper end of the tube 22 (FIG. 1) and sealing ring 27 at the lower end of the tube 22. The annular chamber 25 is connected by a supply tube 28 to a source of air under pressure.

The inner tube 24 in this embodiment of the invention is fabricated from porous metal so that its entire length has a multiplicity of diverse passageways through which the air in the annular chamber 25 can exude or flow through the tube 24 forming a thin film or layer of air on the inner surface of the tube 24. This thin film is so diverse and broken up by the porous metal of the tube 24 that to the sense of touch of an experimenter who puts his finger against this inner surface of the tube 24, it gives the tactile impression of being "greased." The exuding film of air which flows through the minute openings in the porous metal of the tube 24 places this film on the surface of the tube 24 so that the finger of the observer does not actually contact the metal. Similarly, glass in a heavy supply stream 29 which is directed into the open upper end of the guide tube 22 is prevented from sticking to the inner surface of the tube 24 in the event that ambient air currents or other causes act upon the supply stream 29 to make it waver from a true vertical path. In addition, of course, the supply of air exuding through the porous metal of the inner tube 24 functions to cool the tube 24 to further negative the possibility that glass in the supply stream 29 will wet and cling to the metal of the tube 24.

The double-walled guide tube 22 fabricated, as explained, to provide the inner cushioning layer of air, is mounted in a tubular opening generally indicated by the reference number 30 within an inner tubular jacket wall 31 (see also FIG. 2). The inner tubular jacket wall 31 is mounted eccentrically with and parallel to an outer jacket wall 32 which is positioned concentrically with and interiorly of the quill 11. The inner and outer jacket walls 31 and 32 and generally crescent-shaped top and bottom plates 33 and 34 cooperate to define a closed water jacket interiorly of the quill 11 and surrounding the glass guide tube 22. Water is fed into the space defined by the inner and outer tubes 31 and 32 of the jacket from a water supply tube 35 and carried away from this space by a return water tube 36. The circulating water admitted into and circulated through the generally crescent-shaped interior of the water jacket also functions to aid the air flowing in the chamber 25 in controlling the temperature of the glass guide tube 22 and also in controlling heat loss from the glass supply stream 29, for example, to prevent damage to the bearings and motor included in the housing 10.

A partially circular skirt 37 (see also FIG. 3) depends from the lower end of the jacket formed by the inner and outer jacket walls 31 and 32, being welded to and of substantially the same diameter as the outer jacket wall 32. The skirt is located interiorly of the centrifuge 12 and partially encloses a glass stream deflector or chute generally indicated at 38 (see also FIGS. 5 and 6). The chute 38 is formed by a rectangular bottom plate 39, a flat vertically extending back plate 40, two laterally spaced flat side plates 41, a notched front plate 42 (FIG. 6), two angularly extending closure plates 43 and two horizontal, flat partial top plates 44, all of the plates being welded to each other to support and to form a jacket around a contoured, trough-like elbow 45. The chute 38 is supported in position beneath the open lower end of the glass guide tube 22 on the lower end of an air supply tube 46 which extends upwardly through the interior of a core tube 47 spaced between the inner and outer jacket walls 31 and 32 and extending through the upper and lower jacket plates 33 and 34.

The cast elbow 45 is also fabricated from porous metal so that air from the air supply tube 46 admitted into the chamber within the interior of the chute 38 exudes through the elbow 45, as best illustrated in FIG. 5, to provide a cushioning film of air on the curved surface of the elbow 45 to prevent impingement of the supply stream 29 against the metal of the elbow 45 and to aid the supply stream 29 in curving around from its vertical path to a generally horizontal path. It is to be appreciated, of course, that FIG. 5 of the drawings is only illustrative of the fact that under normal operating conditions and with the cushioning film of air exuding through the porous metal of the elbow 45, the glass stream 29 does not strike the metal of the elbow 45 but impinges against the air cushion and is deflected around the curve of the elbow 45 riding on the cushioning film of air flowing through the porous metal from which the elbow 45 is fabricated.

As in the case of the glass guide tube 22, the presence of the cushioning film of air which "greases" the surface of the deflecting elbow 45 prevents the hot glass from wetting the metal surface of the elbow 45 and from collecting thereon and interfering with the free flow of the glass supply stream 29 across the elbow 45 and outwardly therefrom toward the inner surface of the peripheral wall 13 of the centrifuge 12.

In order to secure more uniform distribution of the supply glass over the inner face of the peripheral wall 13 of the centrifuge 12, to build up a uniform "head" layer 21, according to the instant invention a pulsating deflecting jet 48 is employed. The jets 48 by a short arcuate section of tubing having a slit orifice 49 angled upwardly arcuate with respect to the path of movement of the supply stream 29 (see FIG. 3) as it departs from the elbow 45 of the chute 38. Air for the jets 49 is supplied by an air supply tube 50 which extends downwardly through openings formed by a core tube 51 located in the space between the inner and outer jacket walls 31 and 32.

Air is supplied to the air tube 50 and thus to the jet 48 in a controlled pulsating pattern. When air is emitted from the jet 48, for example, it deflects the supply stream 29 upwardly and when no air is flowing therefrom, gravity causes the supply stream 29 to fall downwardly. If, for example, the centrifuge is rotated at a speed of 3,000 r.p.m. and the supply of air to the jet 48 is alternately turned off and on at a rate of 120 cycles per minute, the centrifuge rotates 25 times during each cycle. The air would be on for 12.5 rotations and off for 12.5 rotations which would result in laying down the supply stream 29 in an even alternating helical path. Traversing the interior surface of the peripheral wall 13 from its lower edge to its upper edge and back again, thus insures an even uniform distribution over the entire inner surface of the peripheral wall 13, as illustrated in FIG. 7.

In FIG. 7, the centrifuge 12 is shown as a projection and as turning so as to move toward the left. The supply stream 29 is moving downwardly laying a close helix indicated by the dotted turns embraced by the brackets A. In the position illustrated and assuming the relative speeds set forth just above, the centrifuge has rotated 6 or 6½ rotations since air to the jet 48 was cut off and gravity started to pull the stream 29 downwardly. During the just preceding 12–13 turns, air was being emitted from the jet 48 which traversed the stream 29 upwardly to lay it down in a helical path, some turns of which are indicated by the dotted turns embraced by the brackets B.

Any suitable timing mechanism may be employed to alternately feed and not feed air to the jet 48, no particular mechanism being shown, in selected timing relative to the speed of rotation of the centrifuge, the volume of glass needed to maintain the layer 21 in view of the number of orifices 14 in the centrifuge wall 13, etc.

The air deflecting jet 48 is welded to and supported by a bottom pan 52 which has a partially circular upstanding rim 53 lying just within and overlapping the lower end of the partially circular skirt 37. As can best be seen by reference to FIG. 6, both the depending skirt 37 and the rim 53 of the pan 52 are cut away at the exit side of the chute 38 so as to not interfere with the discharge of the glass stream 29 therefrom.

FIG. 4 illustrates the use of a "puffer" 54 positioned on the lower end of a second air tube 55 so as to emit intermittent jets of air through orifices 56 near its lower end. The rim 53 of the pan 52 has a notch 57 aligned with the orifices 56 and a series of orifices 58 may be drilled through the lower end of the skirt 37 generally aligned with the notch 57 and the puffer orifices 56. When air is puffed from the "puffer" 54 it creates a momentary high pressure area surrounding the rear lower edge of the skirt 37 as an aid to the prevention of "hang-up" of formed fibers on this portion of the apparatus.

In order to further control the temperature of the environment surrounding the chute 38 and, particularly, during starting up of the apparatus, a pair of auxiliary internal gas burners 59 and 60 are mounted on the lower ends of gas supply tubes 61 and 62 respectively. The gas supply tubes 61 and 62 extend downwardly through the interior of the jacket formed by the inner and outer jacket walls 31 and 32 in spaces provided by core tubes 63. A notch 64 is cut in the rim 53 of the pan 52 adjacent each of the burners 59 and 60 and perforations 65 are formed through the lower edge of the skirt 37 adjacent the notches 64 at each burner 59 or 60. As in the case of the "puffer" 54 described above, some of the escaping products of combustion from the burners 59 and 60 as well as some of their flames escape from the interior of the pan rim 53 and the skirt 37 to blow outwardly therefrom, and again, to aid in the prevention of fiber "hang-up" on these parts of the apparatus.

We claim:
1. In an apparatus for forming fine fibers from molten glass having a hollow rotor with a circular peripheral wall that has a plurality of vertically spaced rows of stream forming orifices therein and means for mounting and rotating said rotor on a vertical axis that is co-incident with the center for said peripheral wall, an improved glass distribution means comprising, in combination, a glass supply tube extending downwardly into the interior of said hollow rotor, means for supplying a stream of molten glass into the upper end of said tube, said glass supply tube having a generally horizontal radially outwardly directed lower end, and an intermittently actuated air jet positioned at the end of said glass supply tube and directed across the path of said supply stream for impingement thereagainst after departure thereof from said tube for deflecting said supply stream progressively upwardly across said peripheral wall when said jet is actuated.

2. Apparatus according to claim 1 in which said air jet is actuated by a periodic pulsating means.

References Cited
UNITED STATES PATENTS 3,059,454 10/1962 Kleist _____ 65—14
3,254,482 6/1966 Stalego _____ 65—6 X DONALL H. SYLVESTER, Primary Examiner.

R. L. LINDSAY, Assistant Examiner.